April 19, 1932.  J. CHEVRIER  1,854,885
CONTACT DEVICE FOR THE SUPPLY OF CURRENT
Filed Sept. 12, 1927  5 Sheets-Sheet 1
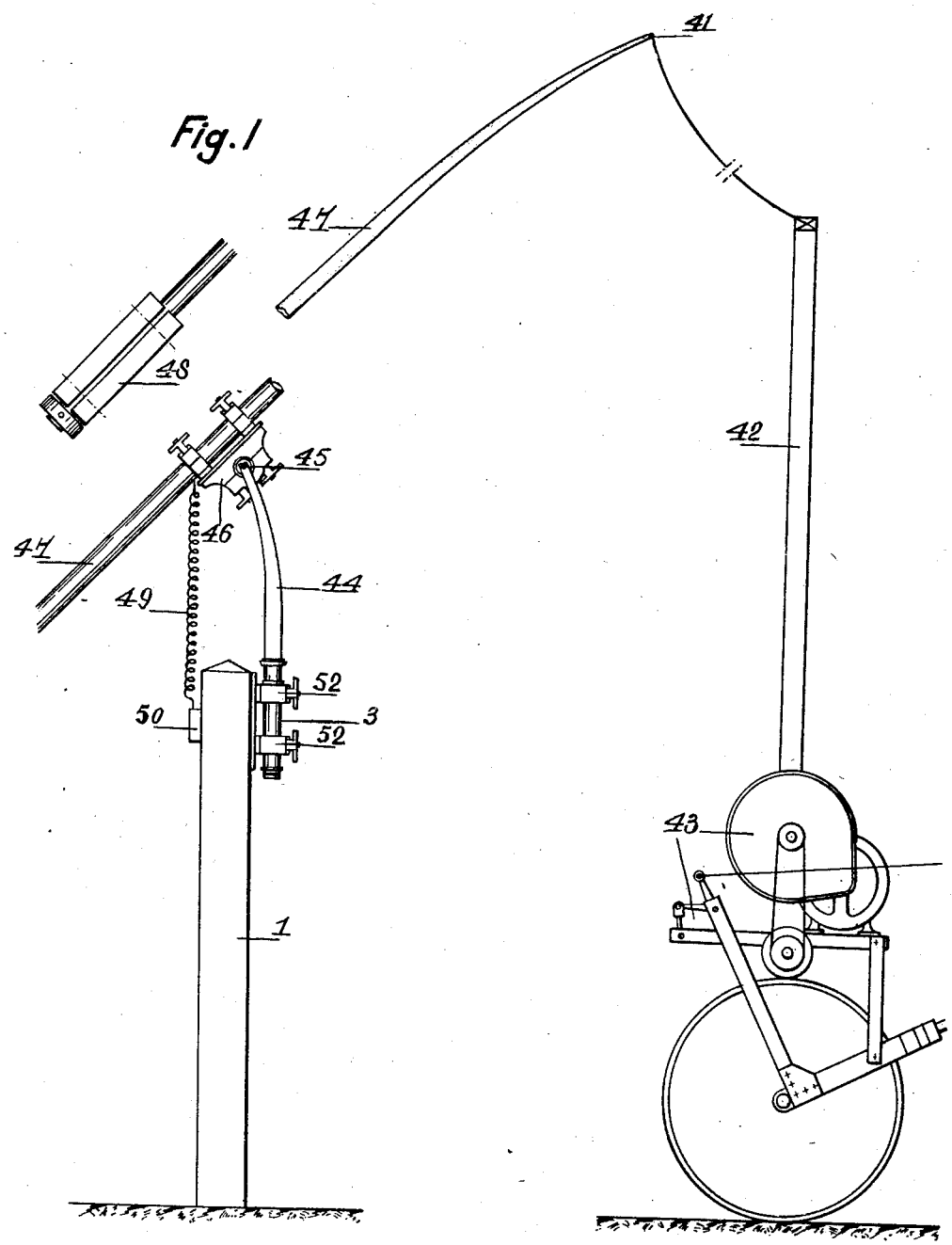

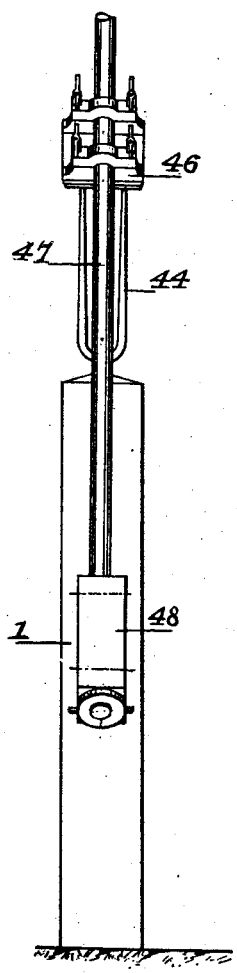
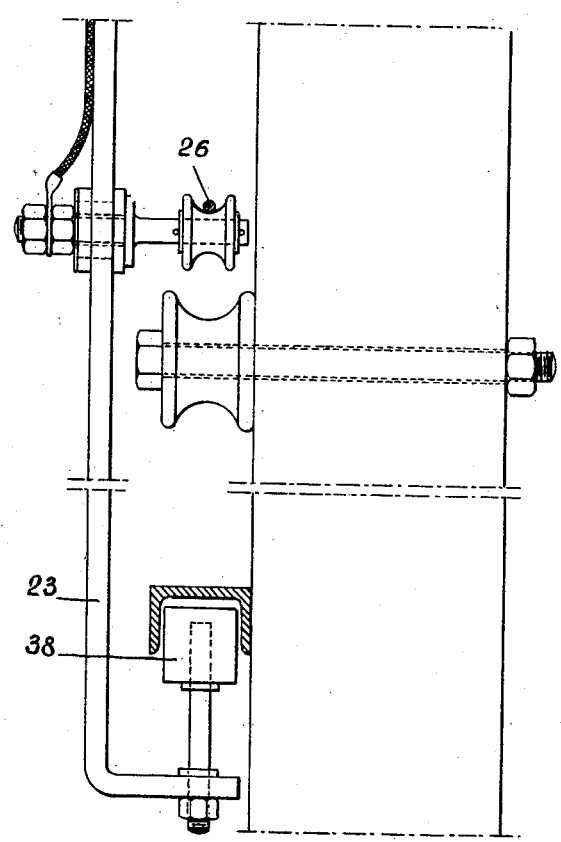

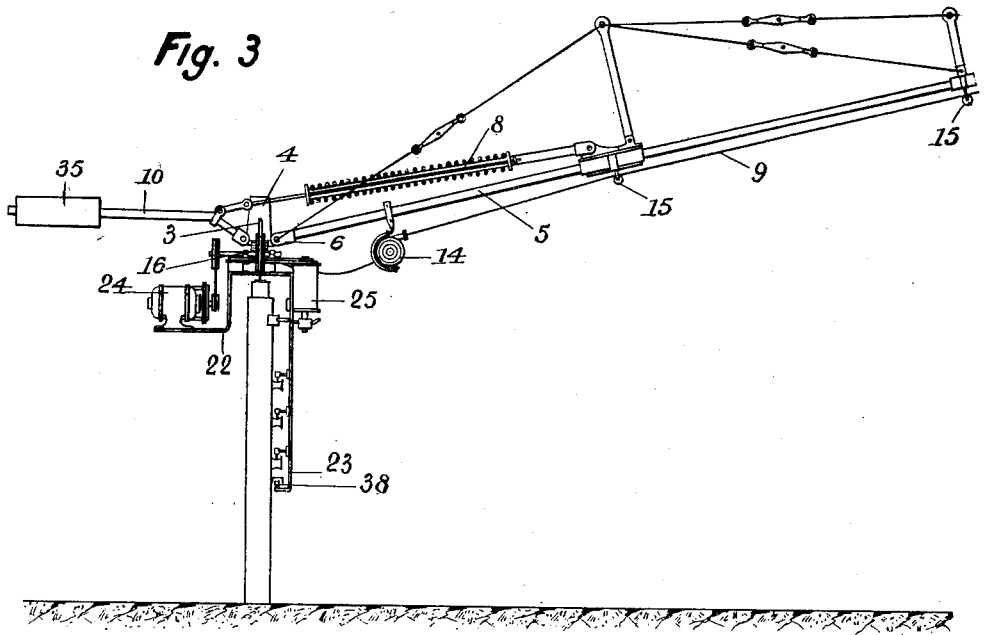
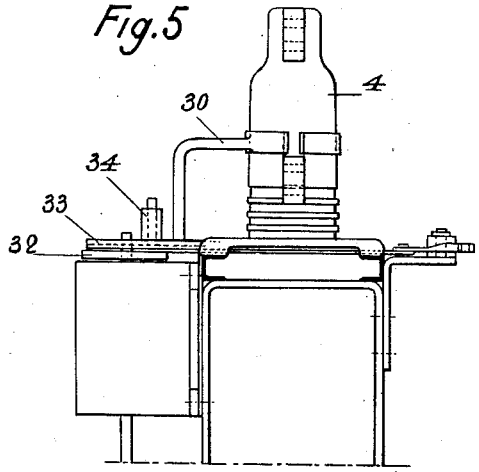
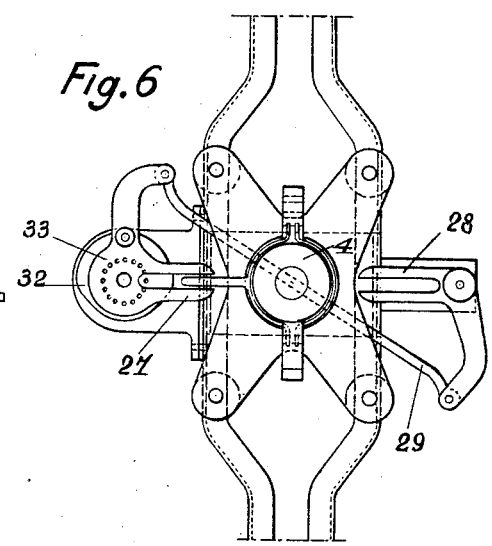

April 19, 1932. J. CHEVRIER 1,854,885
CONTACT DEVICE FOR THE SUPPLY OF CURRENT
Filed Sept. 12, 1927 5 Sheets-Sheet 4
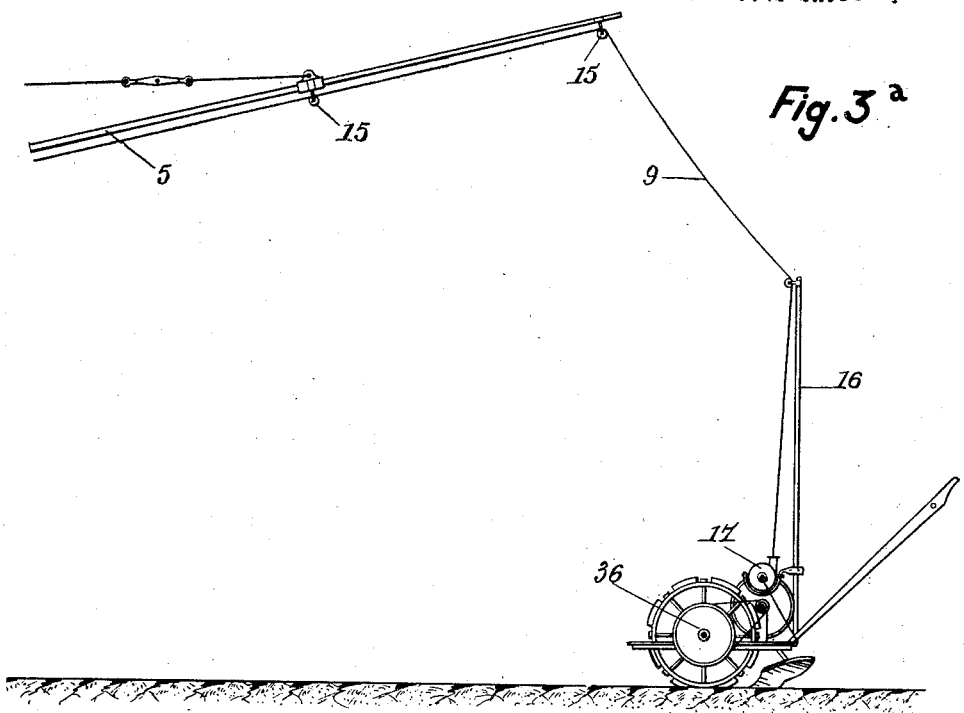
Fig.3ª
Fig.7
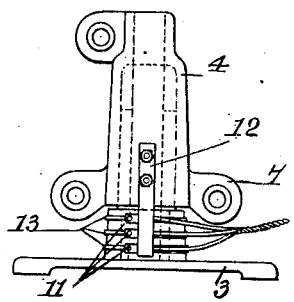
Fig.8
Fig.9
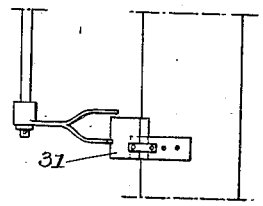

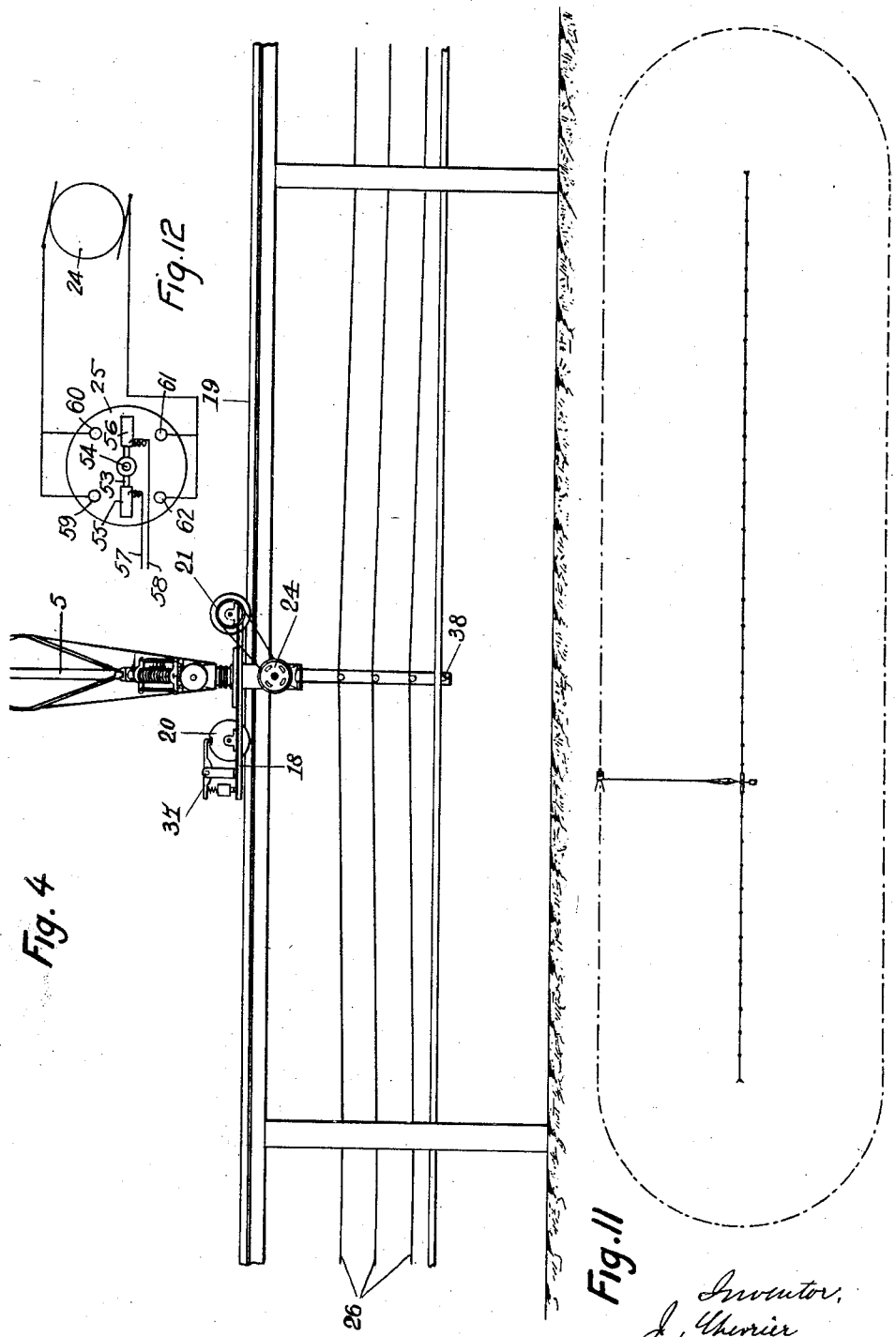

Patented Apr. 19, 1932

1,854,885

UNITED STATES PATENT OFFICE

JULES CHEVRIER, OF CHALON-SUR-SAONE, FRANCE

CONTACT DEVICE FOR THE SUPPLY OF CURRENT

Application filed September 12, 1927, Serial No. 219,089, and in France September 17, 1926.

The present invention relates to a contact device by which electric supply lines or mains may be connected with a movable apparatus in which the current is employed, for instance a motor-driven agricultural implement, in such manner that the functioning of the said implement will not be interfered with by the electric cable, which latter is drawn along the surface of the ground in known manner.

The said contact device consists essentially of a pivoted arm or pole which is mounted upon a stationary post by means of a double pivoting device or joint, whereby the said pole may be pivoted in all vertical planes. A complementary device such as a spring or counterweight constantly urges the said pole into the vertical position. To the said pole is attached a vertical conductor or cable, the outer end of which is attached to the working apparatus or implement, so that the said cable will be held at the proper height above the ground and will not interfere with the various motions of the said implement.

The double pivoting device or joint may be variously constructed. The said pole may be urged into the vertical position by a spring, a weight, an elastic connection, or the like. The said pole may have a tubular construction and the electric cable may be disposed in its interior; or the pole may be provided with external slip rings to provide the contact. The pole preferably consists of a metal tube carrying a bamboo rod at the outer end. The post planted in the ground may consist of a metal tube or a bamboo pole.

The pivot device for the pole is preferably mounted on a rolling carriage which travels on a suitable track consisting for example of a supporting rail and a guiding rail, which are situated in a substantially vertical plane. This will afford a small-sized apparatus which may be simply and rapidly installed.

The said carriage is preferably actuated by an electric motor, under the control of a reversing switch which is actuated by the rotation of the said pole. I may dispose abutments at the ends of the said track to prevent the action of the said reversing switch and to stop the carriage at the end of the rails. A brake under electromagnetic or like control is preferably disposed upon the said carriage by which it may be stopped when its motor is arrested.

In this device, the said pole which is mounted on its carriage will follow all the motions of the agricultural implement without any attention from the driver and in this manner the said apparatus will act upon large areas of ground quite as well as an independent apparatus.

The following description with reference to the appended drawings shows various embodiments of the present invention.

Fig. 1 is a general side view of a form of construction of the apparatus, and Fig. 2 is a corresponding fragmentary front view. Figs. 3 and 3ª taken together are an elevational view of a second construction, and Fig. 4 is a fragmentary end view. Figs. 5 and 6 are respectively elevational and plan views of the carriage, with the reversing device. Fig. 7 is a detail elevational view of the pivot device and the electric contact device. Figs. 8 and 9 are elevational and plan views of one of the track abutments. Fig. 10 shows an electric contact device comprising a roller.

Fig. 11 represents the ground area covered by the apparatus.

In the example shown in Figs. 1 and 2, the double joint consists of the combination of a vertical axle and a horizontal axle, thus forming a sort of universal joint.

Upon a stationary upright or post 1 are disposed the brackets or bearings 52 carrying the vertical axle 3 at the end of which is mounted the fork 44 in the branches of which is mounted the horizontal axle 45. Upon the said axle is pivotally mounted the bearing member 46 to which is secured the arm or pole 47, for instance by clamping screws and collars. The arm 47 consists of a metal tube, and through it is inserted the flexible conductor or cable 49 which enters the said tube at a point near the bearing 46. Said conductor is attached at one end to the terminal 50 and issues from the said pivoting arm at its upper end 41, and proceeds thence, on the usual catenary curve, to the upright or mast 42 which is mounted upon the working apparatus 43.

The electrical connection between the arm 47 and the post 1 may also be made by the use of three horizontal rings mounted on the axle and three corresponding brushes secured to the said post.

The movable device may thus pivot upon the said vertical and horizontal axles, and the arm or pole 47 is thus enabled to assume all positions.

When the motor-driven agricultural implement is situated near the vertical pivot, the arm as well as the cable will be vertical. When the said implement recedes outwardly, the said arm or pole will become correspondingly inclined and finally it will be nearly horizontal. In this event the distance from the implement to the pivot will be twice the length of the arm. This distance may be further increased by the use of the cable drum disposed upon the arm of the implement.

With the use of the pole of 10 meters' length, which may readily be constructed, the said motor implement will cover a radius of 20 meters, and by the addition of a cable drum, this may be increased to 23 or 25 meters and over. The said pole may be made longer or shorter, according to the use which is to be made of the apparatus.

Due to the tension afforded by the counterweight of the pivoting arm, the cable will always be stretched at a selected height above the ground, whereby it will be above all usual obstacles and above the driver's head.

In a pivoting device with vertical axis (Figs. 3 and 4) which consists of a stationary axle 3 and a bell-shaped member 4 rotatable on the said axle, is pivotally mounted an arm or pole 5 which is supported in a forked bracket 6, the axle of which is pivoted in the lug 7 which is disposed at the lower part of the said member 4 and is provided with a bushing.

The said arm which consists of tubes of steel and duralumin, terminated by a flexible bamboo member and braced by piano wires, may be pivoted through some 60 degrees about its joint; in this device the suspended cable 9 is subjected to the reaction effect of the spring 8 by which it is properly stretched, and the said cable connects the end of the said arm or pole with the agricultural implement 36 and supplies it with the current from the main lines.

The weight of the pole and the cable is balanced firstly by the counterweight 35 which is secured to a tube 10 placed in line with the said pole and rigidly connected with the pivot joint, said counterweight being movable about the joint solely in the horizontal direction, and secondly by a guided roller 38 which is movable in a channel consisting of an inverted channel iron member.

To the said bell-shaped member 4 (Fig. 7) is secured a device cosisting of the three brushes 11 and a brush-holder 12, coacting with the three respective slip rings 13 secured to the stationary axle 3 and connected with the current supply lines as will be further stated, and in this manner the current is furnished to the apparatus.

The arrangement comprises an insulated cable 9 carrying several conductors, said cable being automatically wound upon the drum 14, which is being constantly urged to take up slack in the cable by a spring. The said cable is connected with the said slip ring device, and it proceeds below the arm or pole, upon the supporting pulleys 15.

The said cable issues from the last pulley 15 and proceeds upon a catenary curve to the agricultural implement to which it is attached by means of a small flexible upright 16 and a cable drum 17 similar to the one mounted on the pole.

The loose cable is thus suspended above the head of the driver of the said motor apparatus by the pole 5 due to the tension of the pole spring and to the tension afforded by the cable drums 14 and 17. The cable may be automatically lengthened or shortened, firstly by the effect of the pivoting of the pole, and secondly by the additional action of the two cable drums.

To increase its range of action, the pivoting device is mounted on a carriage 18 (Fig. 4) which is movable on a horizontal or slightly inclined rail 19 disposed at a suitable height upon supports planted in the ground. The said carriage is automatically movable according to the travel of the agricultural implement, in the following manner. The said carriage consists of a frame which travels upon two grooved rollers 20—21, and the pivoting device is bolted to said frame between the two rollers.

Upon the said frame are mounted the two supporting arms 22—23, one of which carries the small driving motor 24, and the other a reversing switch 25 and a two pole or three-pole contact device consisting of two or three bronze rollers receiving current from the overhead wires 26 (Fig. 10) which are placed upon them. The said wires rest loosely upon the porcelain pulleys which are mounted upon the members supporting the rail, and are anchored at each end and are connected with the current lines.

By means of a sprocket and two sprocket wheels, the motor may drive the carriage forward or back, according to the direction of the said reversing switch; this latter is controlled by the two forks (Figs. 5 and 6) which are connected together and are joined by a coupling link 29 in such manner that their respective positions will be symmetrically inverted.

According as the pole is situated on one side or the other of the rolling track, the corresponding fork will be placed in action, and will be engaged with the arm 30 which is permanently secured to the bell-shaped member of the pivoted device in the plane of the vertical movement of the said arm. At the end of the stroke, two abutments (Figs. 8 and 9) will stop the said carriage by means of an interlocking device by which the said fork is secured to the reversing switch or is released therefrom. For this purpose, the shaft of said switch has keyed thereto a horizontal disk 32 (Figs. 5 and 6). Upon the said fork is mounted a like disk 33 coaxial with the said switch disk, which is freely movable thereon. These two parallel disks may be brought into connection by means of a ball contained in a tube 34 secured to the said fork disk, said ball being urged by a spring against the lower fork disk, and it is adapted to enter a recess as far as its middle part. The pressure of said ball is regulated in such manner that in normal operation the fork disk will draw with it the switch disk, and that at the end of the stroke the disks will be disconnected by the said abutment.

A diagrammatic plan view of the circuit breaker and reverser is shown in Fig. 12. The circuit breaker and reverser 25 comprises a central piece of insulating material 53 mounted upon a vertical shaft 54; the plate 32 is secured to the same vertical shaft 54. The piece 53 has two knives 55, 56, connected to the current supply by the conductors 57, 58.

The circuit breaker 25 also comprises four blocks 59, 60, 61, 62 connected in pairs to the terminals of the motor 24. In the position shown, the circuit of the motor is opened and the same is at rest. When the mast 5 turns, it drives the plate 32 as has been explained; the piece 53 being mounted upon the same shaft 54 as the plate 32, turns also at the same time as the latter. For a sufficient angle of rotation, the knives 55 and 56 come into contact respectively with the blocks 59 and 61 or the blocks 60 and 62, according to the direction of rotation. The motor 24 is then fed with current; it starts to rotate in one direction or the other according to the position of the reverser, driving the car in the suitable direction.

The operation of the said apparatus is as follows:

The current from the main line passes through the overhead wires 26, the said rollers, the rings 13; the brushes 11, the cable drum 14, the flexible cable 9, and the cable drum 17 of the agricultural implement. A part of the current is shunted into the motor through the reversing device 25.

When the switch is closed, the said implement will travel in a direction parallel with the rolling track, and by means of the said cable it will draw with it the said arm or pole, so that the said bell-shaped member of the pivot device will rotate on its axis and the arm coacting with the said fork will inversely rotate the axle of the reversing switch which is momentarily connected with the said fork. This latter, which was at the dead center, will now assume the position for forward travel, and the motor-driven carriage will move in the same direction as the agricultural implement. Since the respective speeds are properly selected, the said carriage and the arm or pole will move at a somewhat greater speed than the motor-driven agricultural implement.

Let it be supposed that the said implement is stopped. Since the said carriage continues to move forward and the end of the pole remains stationary this latter will assume the opposite direction and will draw with it the said bell-shaped member and its arm whereby the reversing switch will be brought to the dead center.

In this manner the said carriage will be stopped.

If the agricultural device now changes its direction and travels backward, the contrary action will take place and the carriage with the pole will travel to the rear, in the same direction as the agricultural implement, but at a somewhat greater speed. This will form a movable and flexible connection between the said carriage and the implement so that the latter may be moved about in all directions and the driver will not be obliged to pay any attention to the cable which is constantly suspended over his head.

It is to be noted that on Figures 5, 6, 8, 9, the balance 5 is directed toward the left of the figure. At each end of the rolling path there is provided a fixed stop such as 31 (Figs. 8 and 9); on the other hand the shaft (arbor) of the reversing interrupter carries a lug or finger located at the height of stops 31.

When the carriage arrives at the end of its travel the lug strikes stop 31 which causes the reversing interrupter to rotate clockwise; this immediately stops motor 24 and hence also the carriage.

It is to be noted that this operation of the reversing interrupter is made without movement of the balance 5. In fact, the balance acts on the reversing interrupter through a lug 30 of fork 27, plate 33, and a ball; the latter is seated in a tube 34 integral with plate 30 and is thrust by a spring into a seat or socket of plate 32, which is keyed on the shaft of the reversing interrupter. Hence, when stop 31 causes rotation of the reversing interrupter the ball passes from its seat so that the two plates 32 and 33 are disconnected, the balance 5 may thus move freely clockwise.

If, at this moment, the motorcultivator returns to the rear, remaining on the same side of the rolling path, it causes the balance 5 to rotate counter-clockwise; the latter actuates plate 33, but the ball rolls on plate 32 clockwise, without actuating it.

At a given moment the ball drops into the seat or socket of plate 32, and if the motorcultivator continues to advance, plate 33 carries along plate 32 and consequently the reversing interrupter clockwise; the latter causes operation of the motor 24 and the carriage is carried along so as to remove from the end of the rolling path.

If on the contrary, the motorcultivator rotates clockwise so as to return at the other side of the rolling path, the lug 30, in its movement, actuates or carries along the fork 27 with which it is engaged, until the angle which this latter makes with the perpendicular to the rolling path is about 45°; the lug 30 then leaves the fork the latter remaining stationary in this position.

The lug, continuing its movement, then comes in contact with the second fork which occupies a position symmetrical to the first, and opens the arms. The movement continuing, this second fork, always carried along or entrained by the lug, arrives in a position perpendicular to the rolling path.

At this moment the motorcultivator, lead wire, balance, lug and forks are in the same vertical plane, perpendicular to the rolling path; the carriage is always stopped.

The motorcultivator then continues its travel parallel with the rolling path; the balance inclines in the same direction, the lug follows, entrains the fork until it forms an angle of 30° with the perpendicular to the rolling path, a position in which the reverser is engaged and advances the carriage.

During this entire movement the ball of tube 34, after having been forced from its seat in plate 32, rolls thereon without entraining it until, returning to the rear, it again drops into its seat and connects the two plates, as before.

The reverser is then actuated anew by plate 33, that is, by the fork, the lug and the balance.

The field of action of the agricultural implement (Fig. 11) will thus be a rectangle as above specified to each end of which is added a semicircle whose radius is equal to the whole length of the unwound cable.

To afford a more reliable and responsive functioning, I employ a brake 37 (Fig. 4) which is actuated by an electromagnet and serves to hold the said carriage at the head center and to release it for action when the motor is supplied with current.

At the lower part of the extension which supports the said reversing switch and the current supplying rollers, I provide a guiding roller 38 which travels in an inverted channel bar and compensates for all possible failures of the counterweight, whereby the whole apparatus will be constantly equilibrated.

Having now particularly described my invention and in what manner the same is to be performed, I claim as my invention:

1. Apparatus for supplying electric current, comprising a mast mounted on a horizontal pivot, means tending to remove the mast from the horizontal position, a vertical pivot about which the said mast turns freely, a flexible cable conductor suspended from the mast, a carriage supporting the mast, current intakes connecting the carriage with an electrical distribution line, an electric motor actuating the carriage, and a reversing interrupter controlling the motor, the said interrupter being actuated under the influence of the rotation of the mast.

2. Apparatus according to claim 1, comprising a carriage supporting the mast, and a path on which said carriage travels.

3. Apparatus according to claim 1, comprising a carriage supporting the mast, and a supporting rail supporting the carriage.

4. Apparatus according to claim 1, comprising a carriage supporting the mast, a supporting rail supporting the carriage and a guide rail positioned substantially in the vertical plane of said supporting rail.

5. Apparatus according to claim 1, comprising a carriage supporting the mast, and means whereby the mast, on rotating, actuates the reversing interrupter.

6. Apparatus according to claim 1, comprising a carriage supporting the mast, and a fork connected with the reversing interrupter in engagement with a lug integral with the mast.

JULES CHEVRIER.